United States Patent [19]
Hetzner

[11] Patent Number: 5,879,480
[45] Date of Patent: Mar. 9, 1999

[54] PROCESS FOR IMPARTING RESIDUAL COMPRESSIVE STRESSES TO STEEL MACHINE COMPONENTS

[75] Inventor: Dennis W. Hetzner, Jackson Township, Ohio

[73] Assignee: The Timken Company, Canton, Ohio

[21] Appl. No.: 900,673

[22] Filed: Jul. 25, 1997

[51] Int. Cl.[6] .................................................. C21D 1/09
[52] U.S. Cl. ........................ 148/644; 148/525; 148/565
[58] Field of Search ................................... 148/525, 565, 148/644, 529

[56] References Cited

U.S. PATENT DOCUMENTS

| | | | |
|---|---|---|---|
| 3,388,618 | 6/1968 | Evancic et al. | |
| 3,773,565 | 11/1973 | Pye et al. | |
| 3,929,523 | 12/1975 | Kinoshi et al. | 148/526 |
| 4,533,815 | 8/1985 | Ecer. | |
| 5,084,116 | 1/1992 | Mitamura | 148/319 |
| 5,468,308 | 11/1995 | Braza et al. | 148/512 |

FOREIGN PATENT DOCUMENTS

| | | |
|---|---|---|
| 2173303 | 10/1973 | France. |
| 2341655 | 9/1977 | France. |

OTHER PUBLICATIONS

Behr, et al., Studies On Laser Hardening of Tools Made from High–Speed Steel S 6–5–2 (Thyrapid 3343), p. s5–8, 1990.

J. Kusinski, Laser Melting of TI–High Speed Tool Steel, Metallurgical Transactions A, vol. 19A, Feb. 1988, pp. 377–382.

L. Ahman, Microstructure and Its Effect on Toughness and Wear Resistance of Laser Surface Melted and Post Heat Treated High Speed Steel, Metallurgical Transactions A, vol. 15A, Oct. 1984, pp. 1829, 1832–1835.

Young–Won Kim, et al, Laser Melting and Heat Treatment of M2 Tool Steel: A Microstructural Characterization, Metallurgical Transactions A, vol. 10A, Jul. 1979, pp. 881–886.

Harterei Technische Mitteilungen, vol. 49, No. 1, 1 Jan. 1994, pp. s5–11. XP000425857 Reinhold S et al: "Untersuchungen zum Verschleiβverhalten von elektronenstrahl-randschicht–umgeschmolzenem Schnellarbeitsstahl" (Transactions).

Metal Science And Heat Treatment, vol. 33, No. 1/02, 1 Jan. 1991, pp. 87–93, XP000261882 Astapchik S. A. et al: "Structural and Phase Transformations In Steels And Alloys In Laser Heat Treatment".

Metal Science And Heat Treatment, vol. 34, No. 7/08, 1 Jul. 1992, pp. 446–451, XP000338623 Shul' ga A A: "Electron–Beam Treatment of Bearing Steels".

SKF Technology Services, High Fracture Toughness Bearing Development, 1981.

SKF Technology Services, High Energy Beam Hardening of Bearing Rings, 1983.

Primary Examiner—Deborah Yee
Attorney, Agent, or Firm—Polster, Lieder, Woodruff & Lucchesi, L.C.

[57] ABSTRACT

A steel machine component, such as a bearing race, has a critical surface of generally circular configuration. Here the steel of the machine component exists in a state of compression to improve the physical characteristics of the surface. To this end, high speed steel is melted along the full circumference of the surface. Upon cooling to room temperature some of the austenite in the steel transforms into martensite. Tempering converts much of the remaining austenite into martensite, so that the machine component at the surface is almost entirely martensite. Martensite normally occupies a greater volume than austenite, but since the layer of martensite so formed is confined by the underlying core of the machine component, the layer exists in a state of compression. The high speed steel is melted with a laser beam that makes a trace over the full surface of the machine component. Where the underlying core is formed from high speed steel, the steel that is melted derives from the core itself, thus producing a glaze over the core. Where the underlying core is another type of steel, the high speed steel which is melted is supplied from an external source as a filler metal and becomes a cladding that lies over, yet is bonded to, the core.

16 Claims, 2 Drawing Sheets

PROCESS FOR IMPARTING RESIDUAL COMPRESSIVE STRESSES TO STEEL MACHINE COMPONENTS

BACKGROUND OF THE INVENTION

The present invention relates in general to imparting residual stresses to steel machine components and more particularly to a process for imparting such stresses by momentarily melting a high speed steel along a surface of the machine component.

It is well known that the stress state on or below a bearing race subjected to alternating or cyclic contact loads can have a major influence on the service life of the race. Many tapered roller bearings are made from carburizing grades of steels. When components made from these grades are carburized and heat treated, certain advantages are realized that make the components superior to through hardened components, namely more reliable, lower warranty costs, fewer quench cracks in heat treating, decreased sensitivity to grinding injury, and improved toughness or resistance to catastrophic failure.

For carburized components, compressive residual stresses develop during heat treating, and the advantages are to a large measure attributable to these residual stresses. In this regard, the absorption of carbon into a component during carburizing creates a carbon gradient. The carbon level is high near the surface and decreases as the distance away from the surface increases. When steel components are quenched from the austenitizing temperature, martensite is formed. The transformation of austenite to martensite is accompanied by an expansion in volume. The volumetric expansion is directly proportional to the carbon content of the alloy. When quenched, the surface of a component cools more rapidly than the inner portion of a component. In addition, the Ms temperature (temperature at which austenite transforms to martensite) decreases with increasing carbon content. Thus, for a carburized component, the case transforms to martensite at a lower temperature than would occur for a component corresponding in composition to the core. These two effects, operating in unison, cause a relatively high compressive residual stress to be formed at the surface layer. This effect does not occur in components having a uniform composition.

Another instance where compressive residual surface stresses are beneficial involves the press fitting of bearing components onto shafts. It is well known that this can create a tensile stress in the press-fitted component. It has been demonstrated that the press fitting of through hardened AISI 52100 steel definitely has an adverse effect on fatigue life. However, similarly press-fit bearings fabricated from carburized AISI 8620 were found to perform satisfactorily. It was concluded that under press-fitting conditions, carburized 8620 had superior fatigue characteristics compared to 52100.

For comparative purposes, typical residual stress patterns in a carburized LM 12749 cone and a through hardened LM 12749 cone manufactured from a 46100 Powered Metal steel preform are listed below:

Carburized LM 12749 Cone

A group of cones (inner races for tapered roller bearings) were rough machined from 8119 alloy steel, which is available from The Timken Company of Canton, Ohio. The steel has the following composition by weight:

| Carbon | 0.19% | Molybdenum | 0.10% |
|---|---|---|---|
| Manganese | 0.80% | Nickel | 0.30% |
| Silicon | 0.20% | Chromium | 0.40% |
| Iron | remainder | | |

Each cone was carburized and then oil quenched. The cones were then rehardened by austenitizing at 1525° F. for 60 minutes and then quenched into oil. The cones were then tempered at 350° F. and afterwards ground to final dimensions by standard practice. They met the dimensional specifications for LM 12749 cones sold by The Timken Company of Canton, Ohio.

Residual stress measurements were made on and below the surface of the standard carburized cones by x-ray diffraction. The results were as follows:

Carburized 8119 LM 12749 Cones

| Depth Below the Surface (in.). | Residual Stress (ksi) |
|---|---|
| 0.000 | −48.1 |
| 0.005 | −32.1 |
| 0.010 | −28.1 |
| 0.015 | −31.1 |
| 0.020 | −26.6 |
| 0.025 | −34.3 |
| 0.030 | −22.6 |
| 0.040 | −7.4 |

Note: negative stress is compression

1% Carbon LM 12749 Cone

Cone preforms were formed using oil atomized 4600 metal powder which has the following composition after blending with carbon,

| Carbon | 1.00% | Molybdenum | 0.50% |
|---|---|---|---|
| Manganese | 0.020% | Nickel | 1.80% |
| Iron | remainder | | |

After the preforms were compacted, sintered and hot forged, they were rough machined into green LM12749 cones. The cones were hardened by austenitizing at 1525° F. for 60 minutes and then quenched into oil. The cones were then tempered at 350° F. for two hours. The cones were ground to final dimensions by standard practices and met the dimensional specifications for LM12749 cones sold by The Timken Company of Canton, Ohio.

Residual stress measurements were made on and below the surface of the cones by x-ray diffraction. The results were as follows:

Hardened 46100 LM 12749 Cone

| Depth Below the Surface (in.). | Residual Stress (ksi) |
|---|---|
| 0.000 | −3.6 |
| 0.005 | −2.8 |
| 0.010 | −0.5 |
| 0.015 | 2.8 |
| 0.020 | −1.2 |
| 0.025 | −3.8 |
| 0.030 | −3.1 |
| 0.040 | 0.1 |

Note: negative stress is compression

During the welding of steel volume changes in the deposited weld metal and the base metal can occur. These volume changes can lead to distortion, very high residual stresses and often cracking in or adjacent to the weldment. They are attributable to thermal expansion on heating and thermal contraction on cooling, and phase transformations that occur in the weld metal and the heat affected zone.

When welding steel where the heated metal is attached to surrounding cold metal, the cold metal produces a resistance to dimensional change. Since the steel has a low tensile stress at elevated temperatures, most dimensional changes have to occur within the weld metal. This leads to plastic flow in the weld. If the component being welded is relatively large or rigid, residual stress is often tensile and can be as high as the yield stress of the steel. This can often lead to cracking of the weld or base material. Hence, in most steel welding operations, preheating and post welding heating is required to reduce or minimize the detrimental residual stresses that are created. Thus, conventional wisdom strongly suggests relieving residual stresses.

The present invention in contrast to conventional wisdom seeks to impart residual compressive stresses to steel machine components. This is achieved by subjecting the machine component to high energy radiation, such as a laser beam, of sufficient intensity to momentarily melt the steel. Either the steel of the original component is melted to provide a glaze or a filler metal is melted over the original component to provide a cladding. This invention is unique in that stress relief and/or full annealing of the laser processed steel is not performed. In fact the thermal cycles were chosen so as to make the residual stresses that are created during the laser processing and after the thermal treatment to be beneficial to performance. This effect is opposite to almost all welding or cladding procedures where residual stresses that are created are detrimental to performance.

BRIEF DESCRIPTION OF THE SEVERAL VIEWS OF THE DRAWINGS

In the accompanying drawings which form part of the specification and wherein like numerals and letters refer to the like parts wherever they occur.

Corresponding reference numerals will be used throughout the several figures of the drawings.

DETAILED DESCRIPTION OF THE INVENTION

Figure 3:
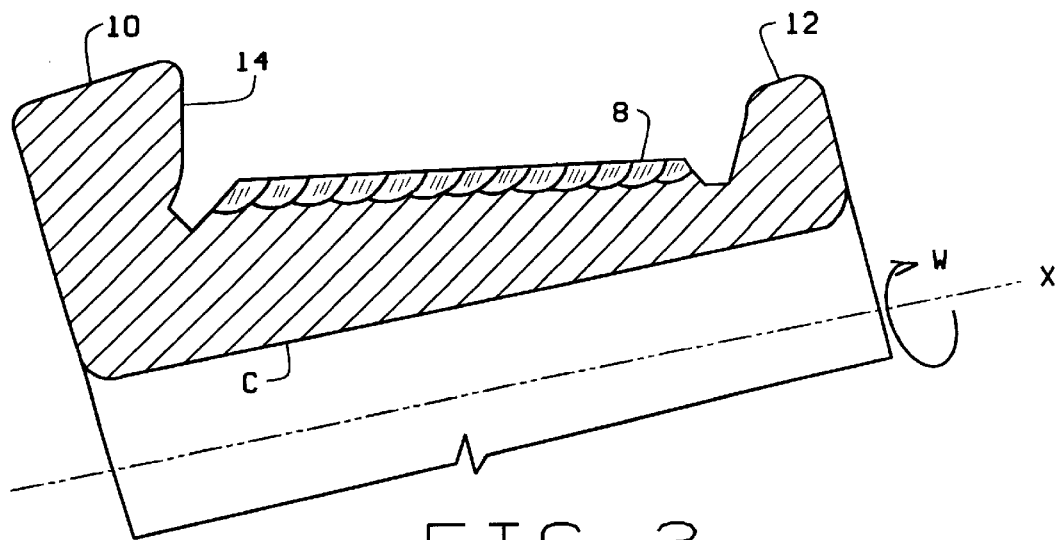
FIG. 3 is a sectional view of a bearing cone, the raceway of which has undergone a laser treatment to produce a glaze or cladding.
Figure 4:
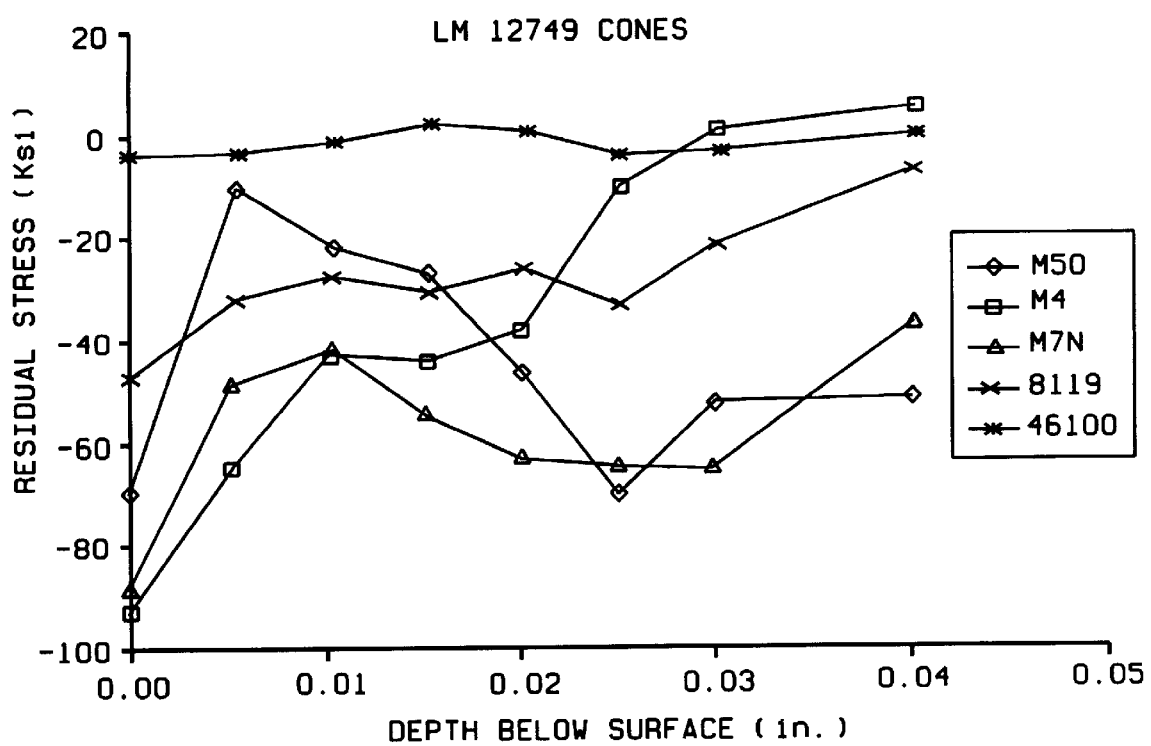
FIG. 4 is a graph reflecting residual stresses as a function of depth for laser treated bearing cones manufactured from different steels.

A machine component which is formed from steel, has a critical surface of circular configuration, and along that surface the metal of the component exists in a state of compressive stress, with the stress being residual or internal in character. The machine component may take the form of a bearing race for an antifriction bearing, for example, a cone 2 of tapered roller bearing (FIG. 3). The cone 2 has a tapered raceway 8 along which tapered rollers move in the operation of the bearing, and the tapered raceway 8 constitutes the critical surface. At the ends of its raceway 8 the cone 2 has ribs 10 and 12 which confine the rollers axially, at least when the cone 2 and rollers are not otherwise confined. The residual compressive stresses enhance the fatigue performance and crack resistance of the component, and are imparted by laser processing. Actually, the laser processing leaves the machine component with a glaze or a cladding along its critical surface, and it is within and below the glaze or cladding that the residual compressive stresses exist.

The laser processing is particularly useful in manufacturing components such as cones 2 that fit over shafts with press-fits. The high compressive residual stresses formed by the processing assist in offsetting high tensile stresses formed by the press-fit. This can be very important in critical applications such as main shaft bearings for jet engines.

The alloys used in this processing are generally regarded as unweldable. If attempts are undertaken to weld these alloys, conventional wisdom would suggest that they should be given a very high preheat prior to welding and a very high post heat treatment after welding. When a high power laser or energy beam is used to create the clad or glaze containing these alloys, no prior heating is required. Furthermore, after the high energy processing, the components are allowed to cool to room temperature. In this state the components contain martensite and retained austenite in the laser processed material. The residual stress in this case is compressive due to the solidification and subsequent cooling of the entire component to room temperature. The components are then double tempered in the range of 700° F. through 1200° F. This thermal process may remove some of the compressive residual stresses that occur from cooling. However, the tempering causes the retained austenite to transform to martensite. As this occurs, the martensite tries to expand because of the volume increase associated with the solid state transformation. Since the component is large relative to the size of the laser processed zone, expansion cannot occur, and this causes additional compressive residual stresses to be created in the laser processed material.

With regard to components fabricated from wrought alloys, the carbon content of the glaze or clad at the critical surface is very uniform and segregation and banding associated with wrought alloys is not present. The depth of the clad or glaze may exceed the case depth of a carburized component. Thus, the compressive residual stresses created may be greater than those that would be formed in a carburized component of similar dimensions. For some steels, the use of a deep freeze cycle before and/or after the first tempering cycles can be used to enhance the transformation of retained austenite to martensite.

The tempering employed after laser glazing possesses several unique characteristics. First, the low temperature cycles maintain the microstructure created by the laser processing. Second, the selected tempering temperature increases the compressive residual stresses within the surface and subsurface regions of the component. Third, this processing creates compressive residual stresses that often are larger than those in identical carburized component. Fourth, the tempering does not change the structure in the remainder of the component.

There are two methods of laser processing that may be employed to create the case layer of the alloy components—laser glazing and laser cladding. Both will impart a residual compressive stress to a surface on a steel component. Where the component is a bearing race for an antifriction bearing, that surface is the circular raceway.

Figure 1:
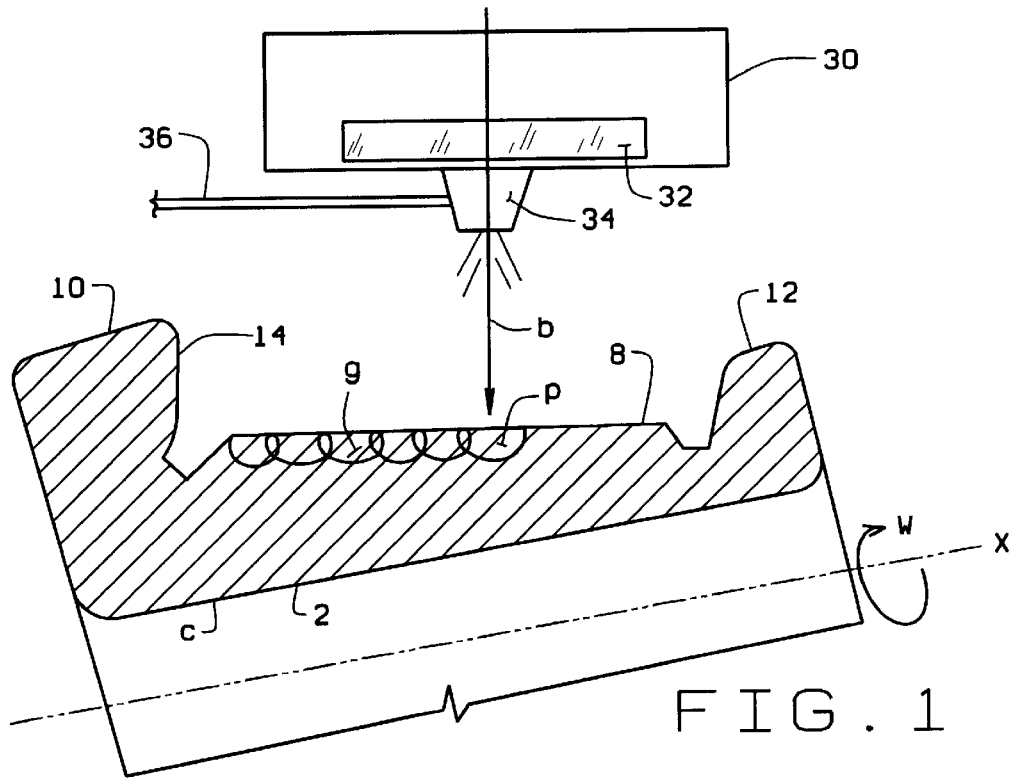
FIG. 1 is a schematic view showing a bearing cone in section and a laser generator directing a beam at the cone to impart a glaze to the cone along its raceway.

To laser glaze the raceway 8 of the cone 2, the cone 2 is first rough machined. In general the diameter of the raceway 8 is approximately 0.015 in. larger than the final race dimension. The larger diameter is required to allow sufficient material to be removed after glazing and heat treating so that a smooth ground surface can be produced. After the cone 2 in a rough machined, it is heat treated to fully harden it. Then it is tempered. Thereafter the hardened and tempered cone 2 is mounted on a mandrel that rotates and, owing to the rotation, the cone 2 revolves about its axis x (FIG. 1).

With the cone 2 rotating, a laser beam b is directed at the raceway 8 on the cone 2. The beam b emanates from a $CO_2$ laser generator 30 having a zinc selenide window 32 and a nozzle 34 that is connected through a tube 36 to a source of inert gas. The beam b that is produced by the laser generator 30 passes through the window 32 and through the nozzle 34 and also through a shield of inert gas discharged by the nozzle 34. The cone 2 is positioned such that its raceway 8 lies within the beam b and indeed is oriented such that the raceway 8 at the point where it is illuminated by the beam b is perpendicular to the beam b. Moreover, the raceway 8 is close enough to the nozzle 34 to enable the gas discharged from the nozzle 34 to completely flood the zone illuminated by the beam b. The gas remains at atmospheric pressure.

Other types of laser generators may be used to produce the beam b. Indeed, the beam 6 need not even be a laser beam, for any high energy beam that has the capacity to melt steel at atmospheric pressure in an inert gas atmosphere will suffice.

The beam b possesses enough energy and intensity to melt the cone 2 at its raceway 8, thus producing a puddle p along the raceway 8. But the cone 2 revolves about its axis x, and as a consequence, the point of impingement moves circumferentially along the raceway 8 and the puddle p of molten metal with it. The puddle p, once the beam passes beyond it, immediately freezes, owing to the mass of the cone 2 that lies behind it at essentially room temperature, and this leaves a glaze g over an underlying core c. The surface velocity is such that the distance between the beam b and the trailing edge of the puddle p remains essentially constant. After 1.1 to 1.3 revolutions the cone 2 is advanced axially so that the trace of the illumination transforms from a circular direction to a spiral direction. But the pitch of the spiral path is less than the width of puddle p and the glazed trace that it produces, so that adjacent convolutions of the spiral trace overlap. The rotation and axial advancement continue until the glaze g occupies the entire raceway 8. To this end, the last pass of the trace reverts to a circle. The glaze g possesses a very fine dendritic network and the carbides of the various alloying elements, while present, exist as very fine particles. The final cone cross-section consists of a microstructurally refined glazed case g on the outside diameter and a core c of material having the same chemical composition as and a structure typical of wrought steel (FIG. 3). The glaze g should be about as thick as the depth of the critical resolved shear stress at 100 percent of catalog load rating.

An outer race for an antifriction bearing (in the case of a tapered roller bearing, the cup) may be laser processed in essentially the same manner after machining, heat treating to harden, and tempering. However, the critical surface, the raceway, is presented inwardly toward the axis x instead of outwardly. And, of course, the glaze is formed on that critical surface. Each rolling element of the bearing may likewise have a glaze or its exterior surface, with the glaze having been produced by laser processing after the rolling elements are heat treated to harden and tempered. In the case of tapered rollers, the glaze should cover the tapered side faces of the rollers.

Laser glazing is generally used where the component is formed from an extremely clean high speed steel, such as VIM-VAR steels. This type of steel is vacuum induction melted (VIM) and then cast into a cylindrical ingot. After the ingot is rough ground to clear its surface, it is placed in a vacuum arc remelt (VAR) furnace and remelted in a vacuum from its bottom to its top, with only a small portion of the ingot being liquid during the melting. In effect, the liquid zone moves through the ingot and the inclusions float to the top, leaving the steel very clean. The absence of inclusions imparts superior performance to the steel in bearing applications. But VIM-VAR steels are very expensive and indeed considerably more expensive than a traditional high speed steels.

Figure 2:
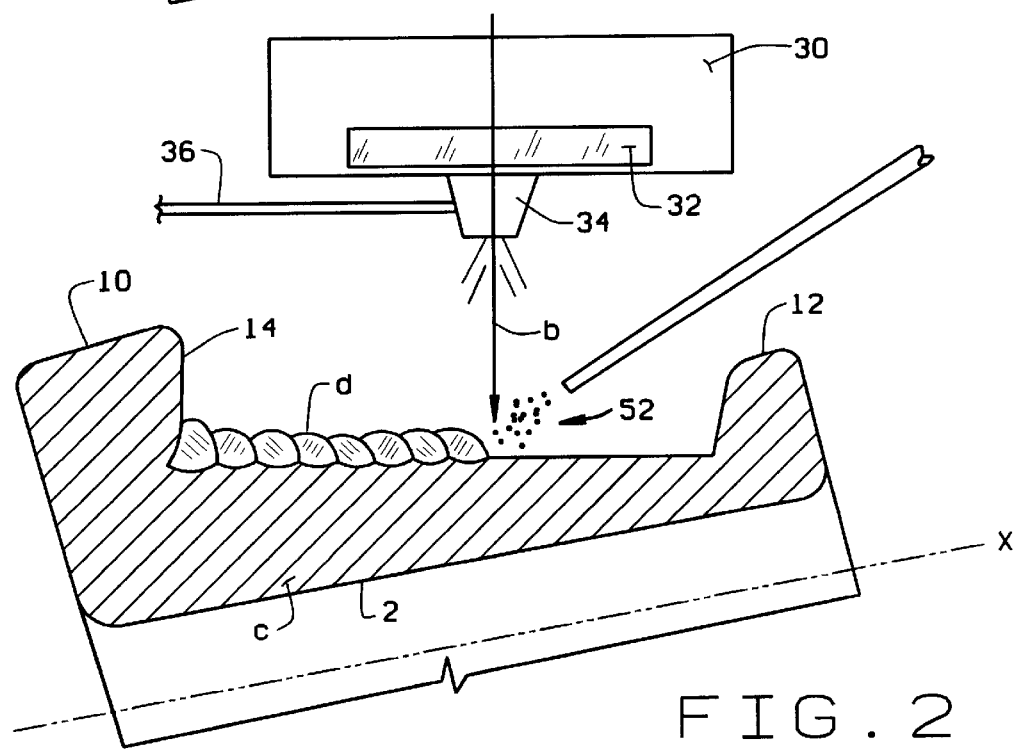
FIG. 2 is a schematic view showing a bearing cone in section and a laser generator directing a beam at the cone to melt a filler metal so as to impart a cladding to the cone along its raceway.

The second form of laser processing, that is laser cladding, starts with the cone 2 having its raceway 8 approximately 0.040 in. smaller than the final dimensions after grinding. But the laser processing begins only after the cone 2 is machined, then heat treated to harden, and finally tempered. This form of processing uses a tube 50 to inject powdered metal 52 into the laser beam b where the beam b impinges upon the raceway 8 of the cone 2 (FIG. 2). Actually, the powdered metal is entrained in an inert gas, the same as that introduced through the nozzle 34. As contrasted with glazing, only a very small amount of the base metal is melted. The powder metal 52 injected into the laser beam b forms a filler metal that adds liquid steel to the cone raceway 8, so that the puddle p which is produced consists primarily of the filler metal. The original cone 2 remains relatively cool in comparison to the temperature of the liquid metal in the puddle p, which is isolated by the inert gas at atmospheric pressure, but heat is extracted from the puddle p at a very fast rate and rapid solidification occurs. This creates a cladding d having a microstructure that is very similar to the structure produced by glazing. The final cladding d (after grinding) should be at least as thick as the depth of the resolved critical shear stress experienced at 100 percent catalog load rating.

In laser cladding, the cone 2 is rotated about its axis x and a helical trace is formed. The cladding parameters are such that a fully dense deposit of rapidly solidified material is applied to the original cone 2. In instances where it is not possible to form a cladding d of sufficient thickness in one pass, additional passes may be used to build up a cladding d of appropriate thickness. Here again, the final cone cross-section consists of a microstructurally refined cladding d on the outside diameter and a core c of material having a structure typical of wrought steel (FIG. 3). The powdered metal that forms the filler metal and becomes the cladding d should be a clean high speed steel such as VIM-VAR steel. The metal of the original cone 2 in this instance is usually a high speed steel or some other temper resistant alloy.

The filler metal that goes into the puddle p and then cools to form the cladding d may derive from a wire. In that event, the wire is fed into the beam b instead of the powdered metal 52.

Basically, where the laser processing produces a glaze, the component on which the glaze is formed should be high speed steel—indeed, an extremely clean high speed steel, that is a steel almost entirely free of inclusions. VIM-VAR steel meets these requirements. Owing to the heat treatment and tempering before glazing, the core of this component contains a large amount of martensite—indeed, its composition is almost entirely martensite. The glaze, being derived from the component itself, has the same chemical composition as the core steel. But the transformation from the liquid state to the solid state initially leaves the glaze with both martensite and retained austenite. The formation of martensite during the cooling perhaps imparts some residual compressive stress. However, subsequent tempering converts most of the retained austenite to martensite, and this conversion is accompanied by a greater tendency to expand, which is resisted by the underlying core. The result is even more residual stress of a compressive character in the glaze. The tempering includes heating the glazed machine component to between 700° F. and 1200° F. and may include cooling in liquid nitrogen before tempering or as between the two tempering cycles or both. Some high speed steels may require a deep freeze, such as immersion in liquid nitrogen, between the two tempering cycles.

Where the laser processing produces a cladding, the original machine component—that is to say, that much of it which forms the core—may be a temper resistant steel or even an air melted high speed steel. It need not be totally free of inclusions, but the filler metal that becomes the cladding should be a very clean high speed steel, because high speed steel reacts favorably to heat treatment and tempering in the sense that it can be converted almost entirely into martensite and the absence of inclusions provides desired surface characteristics. The laser beam not only melts the filler metal as it is introduced into the beam, whether it be as a powder or a wire, but it also melts the surface region of the underlying core, so that the filler metal bonds to the underlying core—in effect, being welded to it. The filler metal of course becomes the cladding.

Upon cooling from a molten condition to essentially room temperature, high speed steel acquires some martensite which is of course very hard. The remainder is retained as austenite. Upon heating most steels lose hardness because the martensite in it is tempered. High speed steel if heated to about 1050° F. will become harder. This is because retained austenite transforms into martensite and because secondary carbides precipitate. Martensite normally occupies a greater volume than austenite. However, the cladding, when converted to a high proportion of martensite, cannot expand, so it acquires a residual compressive stress.

Generally speaking high speed steel contains about 15% by weight alloying elements, 0.8–1.3% carbon, and the remainder iron. The alloying elements usually include manganese, chromium, molybdenum, silicon, tungsten, and vanadium. In comparison, alloy steel has 3–4% alloying elements, less than 0.5% carbon and the remainder iron. Chromium, molybdenum, nickel and manganese are the primary alloying elements. Plain carbon steel has up to 1% carbon, about 0.5% manganese, and the remainder iron.

EXAMPLE I

A group of cones 2 were rough machined from annealed VIM-VAR M 50 high speed steel, which is available from Latrobe Steel Company of Latrobe, Pa., The steel has he following composition by weight:

| Carbon    | 0.85% | Molybdenum | 4.50%     |
|-----------|-------|------------|-----------|
| Manganese | 0.30% | Vanadium   | 1.00%     |
| Silicon   | 0.20% | Chromium   | 4.10%     |
| Tungsten  | 0.00% | Iron       | remainder |

Each cone 2 was austenitized at 2150° F. for 5 minutes and then quenched into 1000° F. salt. After cooling to room temperature each cone 2 was double tempered at 1050° F. for 2 hours. The cone 2 was rotated at the angular velocity of 114.7 rev./min. about its axis x and traversed from the small end to the large end at a velocity of 3.44 in./min., all while illuminated with a laser beam b along its raceway 8. This corresponds to an average surface velocity of 400 in./min. The laser power was 4.96 KW.

After glazing each cone 2 was retempered twice at 1050° F. for two hours. A glaze having a minimum depth of 0.031 in. after final grinding and extending over the entire length of the raceway 8 was produced. The cone 2 after the final grind met the dimensional specifications for LM 12749 cones sold by The Timken Company of Canton, Ohio.

In the glaze a fine dendritic microstructure, containing very find carbides tempered martensite and some retained austenite resulted. The hardness of the glaze g after performance testing was 761 Knoop, while the hardness of the core c was 781 Knoop. No cracks, porosity or microstructural defects were observed in the glaze g.

Residual stress measurements were made on the surface of the cone by x-ray diffraction. The cone was electrolytically polished to remove material from the surface. In this manner, the residual stress at increasing depths below the surface was measured. The results were as follows:

| Glazed M50 LM 12749 Cones | |
|---|---|
| Depth Below Depth Below the Surface (in.). | Residual Stress (ksi) |
| 0.000 | −68.9 |
| 0.005 | −10.3 |
| 0.010 | −22.2 |
| 0.015 | −27.6 |
| 0.020 | −47.1 |
| 0.025 | −71.0 |
| 0.030 | −53.6 |
| 0.040 | −31.4 |

Note: negative stress is compression

EXAMPLE II

A group of cones 2 were rough machined from annealed M4 high speed steel, which is available from Latrobe Steel Company of Latrobe, Pa. The steel has the following composition by weight:

| Carbon    | 1.32% | Molybdenum | 4.50%     |
|-----------|-------|------------|-----------|
| Manganese | 0.30% | Vanadium   | 4.00%     |
| Silicon   | 0.20% | Chromium   | 4.50%     |
| Tungsten  | 5.50% | Iron       | remainder |

Each cone 2 was austenitized at 2225° F. for 5 minutes and then quenched into 1050° F. salt. After cooling to room temperature each cone 2 was double tempered at 1000° F. for 2 hours. The cone 2 was rotated at the angular velocity of 114.7 rev./min. about its axis x and traversed from the small end to the large end at a velocity of 3.44 in./min., all while illuminated with a laser beam b along its raceway 8. This corresponds to an average surface velocity of 400 in./min. The laser power was 4.96 KW.

After glazing each cone 2 was retempered twice at 1000° F. for two hours. A glaze having a minimum depth of 0.020 in. after final grinding and extending over the entire length of the raceway 8 was produced. The cone 2 after the final grind met the dimensional specifications for LM 12749 cones sold by The Timken Company of Canton, Ohio. The hardness of the glaze g after performance testing was 939 Knoop, while the hardness of the cone c was 860 Knoop. No cracks, porosity or microstructural defects were observed in the glaze g.

Residual stress measurements were made on and below the surface of the cone by x-ray diffraction. The results were as follows:

Glazed M4 LM12749 Cones

| Depth Below the Suface (in.). | Residual Stress (ksi) |
| --- | --- |
| 0.000 | −93.1 |
| 0.005 | −65.0 |
| 0.010 | −43.6 |
| 0.015 | −44.7 |
| 0.020 | −38.9 |
| 0.025 | −10.3 |
| 0.030 | 0.7 |
| 0.040 | 4.9 |

Note: negative stress is compression

EXAMPLE III

A group of cones 2 were rough machined from annealed M7N high speed steel, which is available from Latrobe Steel Company of Latrobe, Pa. The steel has the following composition by weight:

| Carbon | 1.02% | Molybdenum | 8.50% |
| --- | --- | --- | --- |
| Manganese | 0.30% | Vanadium | 1.85% |
| Silicon | 0.20% | Chromium | 3.75% |
| Tungsten | 1.75% | Iron | remainder |

Each cone 2 was austenitized at 2200° F. for 5 minutes and then quenched into 1000° F. salt. After cooling to room temperature each cone 2 was double tempered at 1000° F. for 2 hours. The cone 2 was rotated at the angular velocity of 143.5 rev./min. about its axis x and traversed from the small end to the large end at a velocity of 2.87 in./min., all while illuminated with a laser beam b along its raceway 8. This corresponds to an average surface velocity of 500 in./min. The laser power was 3.83 KW.

After glazing each cone 2 was retempered twice at 1000° F. for two hours. A glaze having a minimum depth of 0.30 in. after final grinding and extending over the entire length of the raceway 8 was produced. The cone 2 after the final grind met the dimensional specifications for LM 12749 cones sold by The Timken Company of Canton, Ohio. The hardness of the glaze g after performance testing was 894 Knoop, while the hardness of the core c was 734 Knoop. No cracks, porosity or microstructural defects were observed in the glaze g.

Residual stress measurements were made on and below the surface of the cone by x-ray diffraction. The results were as follows:

Glazed M7N LM 12749 Cones

| Depth Below the Surface (in.). | Residual Stress (ksi) |
| --- | --- |
| 0.000 | −88.5 |
| 0.005 | −48.9 |
| 0.010 | −42.3 |
| 0.015 | −55.4 |
| 0.020 | −63.7 |
| 0.025 | −66.0 |
| 0.030 | −66.3 |
| 0.040 | −37.9 |

Note: negative stress is compression

What is claimed is:

1. A process for imparting a residual compressive stress to a steel machine component along a surface on the machine component after the machine component has undergone a heat treatment to harden it, said process comprising: melting a high speed steel along the surface with the thickness of the molten steel being substantially less than the thickness of the machine component at the surface; and rapidly solidifying the molten steel so that at least some of the austenite in the solidified steel transforms into martensite with an accompanying expansion in volume; and thereafter tempering the machine component to convert more of the austenite in the solidified steel into martensite, whereby the solidified steel acquires a residual compressive stress.

2. The process according to claim 1 wherein the melting occurs in a localized zone which is advanced along the surface.

3. The process according to claim 2 wherein the molten steel rapidly solidifies by losing heat to the solid steel of the machine component.

4. The process according to claim 3 wherein the step of melting includes directing a beam of radiation at the localized zone of the surface with enough intensity to melt a steel at the localized zone, and effecting movement between the machine component and the beam such that localized zone produces a trace that extends along the surface.

5. The process according to claim 4 wherein the component is formed from high speed steel and the steel that is melted along the surface is the steel in the machine component.

6. The process according to claim 4 wherein the high speed steel that is melted along the surface derives from a source external to the machine component and differs from the steel of the machine component.

7. The process according to claim 1 wherein the machine component has an axis and the surface closes upon itself around the axis.

8. The process according to claim 7 wherein the surface lies along the periphery of the component.

9. The process according to claim 7 wherein the surface is generally circular.

10. A process for imparting a residual compressive stress to a high speed steel machine component along a surface on the machine component after the machine component has undergone a heat treatment to harden it, said process comprising: directing a beam of radiation at the surface with sufficient intensity to melt the surface in a localized zone along the surface, whereby a puddle of molten steel forms along the surface; effecting movement between the beam and the machine component such that the puddle moves along the surface and the molten metal, once it departs the beam, rapidly loses heat to the remainder of the machine component and solidifies to form a glaze, with the glaze containing substantial amounts of retained austenite and martensite; and tempering the machine component including the glaze to convert more of the retained austenite in the glaze to martensite, whereby the tendency of the martensite to occupy a greater volume induces a compressive stress.

11. The process according to claim 10 wherein the beam is a laser beam.

12. The process according to claim 10 wherein the surface is generally circular and the glaze extends over the full circumference of the surface.

13. A process for imparting a residual compressive stress to a steel machine component along a surface on the machine component, said process comprising: placing a high speed steel filler metal along the surface; directing a beam of radiation at the surface and the filler metal with sufficient intensity to melt the filler metal in a localized zone along the surface, whereby a puddle of the molten filler metal forms along the surface; effecting movement between the beam and the machine component such that the puddle moves over the surface and the molten filler metal, once it departs the beam, rapidly loses heat to the machine component and solidifies, bonding to the machine component in the form of a cladding containing substantial amounts of austenite and martensite; and tempering the clad machine component to convert retained austenite in the cladding into martensite, whereby the tendency of the martensite to occupy a greater volume induces a compressive stress in the cladding.

14. The process according to claim 13 wherein the beam is a laser beam.

15. The process according to claim 13 and further comprising heat treating the machine component, before the cladding is applied, to harden it.

16. The process according to claim 13 wherein the surface is generally circular and the cladding extends over the full circumference of the surface.

\* \* \* \* \*